United States Patent
Yim

(10) Patent No.: US 6,680,754 B1
(45) Date of Patent: Jan. 20, 2004

(54) DIGITAL BROADCASTING RECEIVING REALIZING PICTURE-IN-PICTURE FUNCTION USING A PLURALITY OF DECODERS

(75) Inventor: Myung-Sik Yim, Seoul (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 545 days.

(21) Appl. No.: 09/603,375

(22) Filed: Jun. 26, 2000

(30) Foreign Application Priority Data

Jun. 25, 1999 (KR) .............................. 99-24162

(51) Int. Cl.[7] .............................................. H04N 5/45
(52) U.S. Cl. ...................................... 348/565; 348/567
(58) Field of Search ................................ 348/565, 566, 348/567, 563, 564, 586, 584, 588, 731, 732, 725; H04N 5/45

(56) References Cited

U.S. PATENT DOCUMENTS 5,598,222 A * 1/1997 Lane .......................... 348/568
5,657,092 A * 8/1997 Kim ........................... 348/565
6,115,080 A * 9/2000 Reitmeier ................... 348/731
6,204,887 B1 * 3/2001 Hiroi .......................... 348/565
6,373,527 B1 * 4/2002 Lee ............................ 348/564
6,459,456 B1 * 10/2002 Oh .............................. 348/564

* cited by examiner

Primary Examiner—Michael H. Lee
(74) Attorney, Agent, or Firm—Sughrue Mion, PLLC

(57) ABSTRACT

A digital broadcasting receiver for realizing a picture-in-picture (PIP) screen using a plurality of decoders is provided. The digital broadcasting receiver includes a first decoder 30 and a second decoder 80 for decoding each of a plurality of broadcasting signals, and outputs two broadcasting signals on a PIP screen. That is, each of the broadcasting signals which are input simultaneously is decoded in the first decoder 30 and the second decoder 80, and the decoded image signals are output on the PIP screen. Thus, the digital broadcasting receiver provides an effect of performing a PIP screen function in which a plurality of decoders decode each of the broadcasting signals.

9 Claims, 2 Drawing Sheets

DIGITAL BROADCASTING RECEIVING REALIZING PICTURE-IN-PICTURE FUNCTION USING A PLURALITY OF DECODERS

BACKGROUND OF THE INVENTION

1. Field of the Invention

The present invention relates to a digital broadcasting receiver, and more particularly, to a digital broadcasting receiver for providing a picture-in-picture (PIP) function using a plurality of decoders in which a plurality of digital broadcasting signals are decoded, respectively, to provide a PIP screen.

2. Description of the Related Art

With a recent digital trend, a digital broadcasting service of a high definition will be initiated soon. A digital broadcasting receiver for receiving and viewing a high definition digital broadcasting signal has a large-scale screen in general. Various channels can be received and displayed on this large-scale screen at the same time. Thus, a digital broadcasting receiver should have a PIP function for receiving a variety of channels at the same time and displaying the same on a screen. However, a conventional digital broadcasting receiver performing the above PIP function cannot decode digital broadcasting signals received via various channels at the same time, nor output a PIP screen.

SUMMARY OF THE INVENTION

To solve the above problems, it is an object of the present invention to provide a digital broadcasting receiver for decoding a respective digital broadcasting signal via a plurality of decoders to perform a PIP function.

To accomplish the object of the present invention, there is provided a digital broadcasting receiver for realizing a picture-in-picture (PIP) screen using a plurality of decoders, the digital broadcasting receiver comprising: a plurality of tuners for detecting a broadcasting signal of each selected channel and outputting the detected result; a plurality of channel decoders for decoding a broadcasting signal input from each tuner into a prior-to-being-channel-coded state; a first decoder for decoding a broadcasting signal which has been channel-decoded from one of the plurality of channel decoders and outputting first broadcasting image data; a second decoder for decoding a broadcasting signal which has been channel decoded from another of the plurality of channel decoders and outputting second broadcasting image data, and for signal-processing the first and second broadcasting image data in such a manner that a PIP screen can be output; a plurality of memories connected to the first and second decoders, for storing broadcasting signals; and a host processor for controlling all the elements, and realizing a PIP screen using a received broadcasting signal.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE PREFERRED EMBODIMENTS

A preferred embodiment of the present invention will be described with reference to the accompanying drawings.

Figure 1:
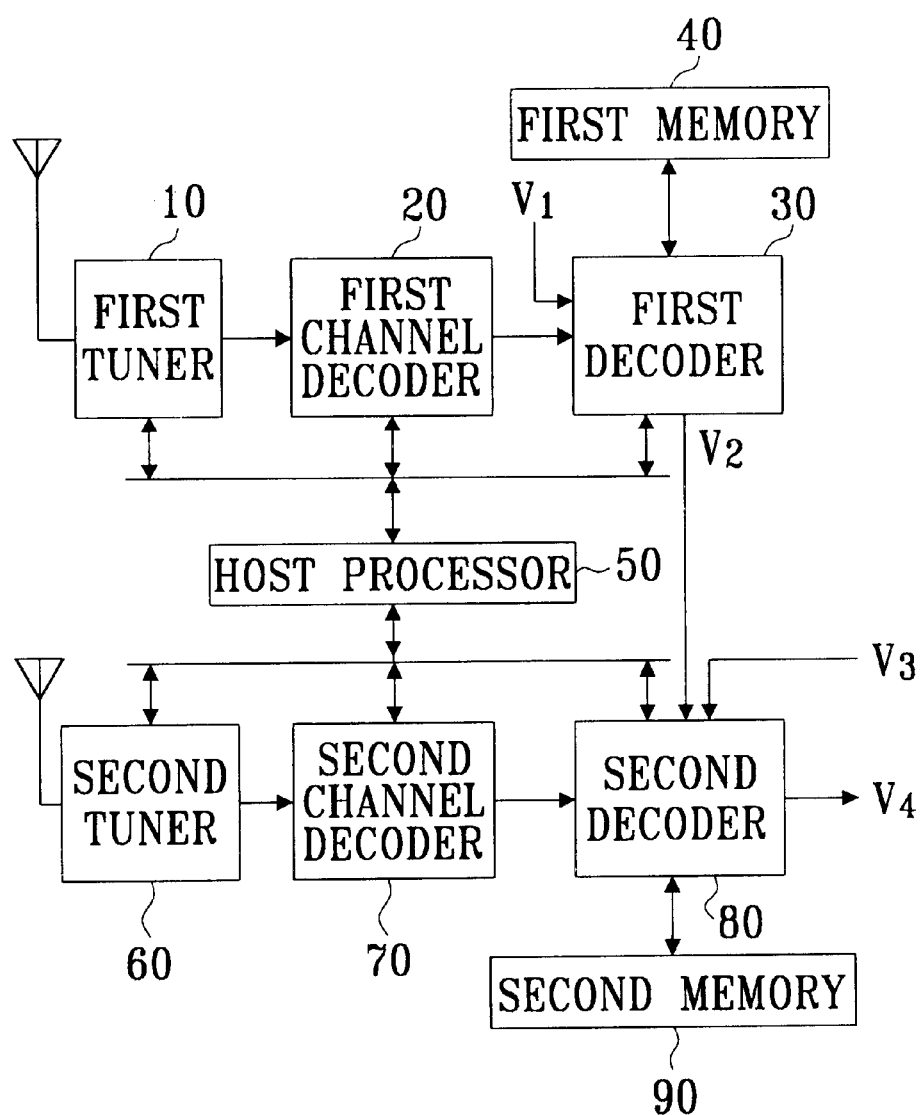
FIG. 1 is a block diagram showing a digital broadcasting receiver according to an embodiment of the present invention is applied.

Referring to FIG. 1, the digital broadcasting receiver includes first and second decoders 30 and 80 connected for decoding a video stream from a respective transport stream (TS) of two selected channels and performing a PIP function.

The digital broadcasting receiver includes first and second tuners 10 and 60 for selecting a transport stream (TS) of a desired channel, first and second channel decoders 20 and 70 for channel-decoding a TS input from each tuner, first and second decoders 30 and 90 for decoding a channel-decoded TS of each channel decoder, and a host processor 50 for controlling operations of all the elements. In FIG. 1, the first decoder 30 is connected to a first memory 40, and the second decoder 80 is connected to a second memory 90, in such a manner that data is mutually received or transmitted.

The operation of the digital broadcasting receiver realizing a picture-in-picture (PIP) function using a plurality of decoders in FIG. 1 having the above structure as described above will be described below with reference to FIG. 2.

It is assumed that a user receives two broadcasting signals and applies a command for realizing a PIP screen in the digital broadcasting receiver of FIG. 1.

In FIG. 1, the host processor 50 outputs a channel select control signal to the first and second tuners 10 and 60 according to the user command. The first and second tuners 10 and 60 select a respective transport stream (TS) of a user's desired channel according to the channel select control signal of the host processor 50. The selected transport stream (TS) is supplied to the first and second channel decoders 20 and 70. The first and second channel decoders 20 and 70 channel-decode the supplied transport stream (TS) and decode the same into the prior-to-being-channel-coded state. The first and second channel decoders 20 and 70 supply the channel-decoded transport stream (TS) to the first and second decoders 30 and 80, respectively. The transport stream (TS) supplied to the first decoder 30 is stored in the first memory 40 and then read out under the control of the host processor 50, in which the read transport stream (TS) is decoded so as to be output on a screen. Also, the first decoder 30 signal-processes an external video signal so as to be output on the screen, in the case that the external video signal is input via an input port VI. That is, the first decoder 30 decodes a broadcasting signal and outputs the decoded result to the second decoder 80 in the case that the user selects a function of outputting the broadcasting signal on the screen, and outputs the external video signal to the second decoder 80 in the case that the user selects a function of outputting the external video signal on a screen. However, the first decoder 30 of the present embodiment selects the broadcasting video data among the external video signal and the broadcasting video data under the control of the host processor 50 and outputs the selected broadcasting video data to the second decoder 80 via an output port V2.

Meanwhile, the second decoder 80 receives the channel-decoded transport stream (TS) from the second channel decoder 70 and stores the received result in the second memory 90, and then reads the stored transport stream (TS) and decodes the read transport stream (TS) so as to be output on the screen under the control of the host processor 50. Also, the second decoder 80 signal-processes the external video signal so as to be output on the screen in the case that the external video signal is input from an input port V3. The second decoder 80 decodes the broadcasting video data from the first decoder 30 and the transport stream (TS) supplied from the second channel decoder 70 under the control of the host processor 50 and realizes and outputs a PIP screen using the decoded broadcasting video data.

Hereinafter, the operation of the second decoder 80 realizing the PIP screen will be described in more detail with reference to FIG. 2.

Figure 2:
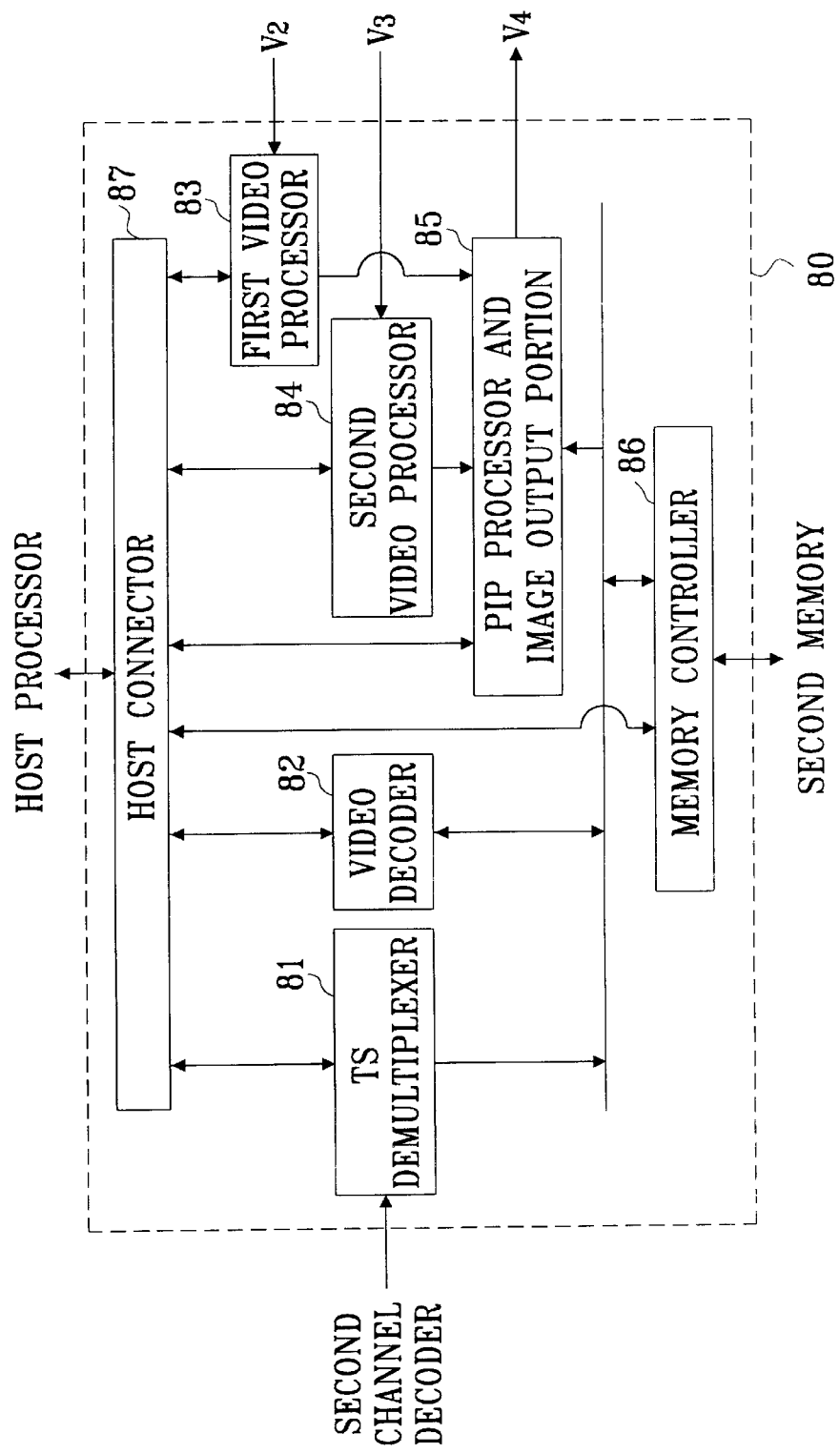
FIG. 2 is a block diagram showing the second decoder in the FIG. 1 apparatus in detail.

FIG. 2 is a block diagram showing the second decoder 80 in the FIG. 1 apparatus in detail. The second decoder 80 includes a TS demultiplexer 81 for demultiplexing a channel-decoded transport stream (TS) supplied from the second channel decoder 70, a video decoder 82 for decoding a video stream, a first video processor 83 for format-transforming broadcasting video data received via an output port V2 of the first decoder 30, a second video processor 84 for format-transforming the external video signal received via the external input port V3 or the broadcasting video data, and a PIP processor and image output portion 85 having an output port V4 for outputting a PIP screen. Also, the second decoder 80 includes a memory controller 86 for receiving data from or transmitting data to each element of the second memory 90 and the second decoder 80, and a host connector 87 for connecting each element of the second decoder 80 to the host processor 50.

In FIG. 2, the TS demultiplexer 81 receives the channel-decoded transport stream (TS) from the second channel decoder 70 and demultiplexes a video stream, an audio stream and a data stream from the input channel-decoded transport stream (TS). Then, the TS demultiplexer 81 extracts the video stream among the demultiplexed streams and supplies the extracted result to the memory controller 86. The supplied video stream is stored in the second memory 90 via the memory controller 86. The video decoder 82 reads the video stream stored in the second memory 90 via the memory controller 86 and decodes the same, and then stores the decoded result in the second memory 90 again. Meanwhile, the first video processor 83 receives broadcasting video data input via the output port V2 of the first decoder 30 and format-transforms the received broadcasting video data so as to be output on a PIP screen. Here, the first video processor 83 format-transforms the broadcasting video data into a sub-picture format in the case that an image to be output on the screen is a sub-picture, and format-transforms the broadcasting video data into a main picture format in the case that an image to be output on the screen is a main picture, under the control of the host processor 50, and outputs the transformed result to the PIP processor and image output portion 85. At the same time, the second video processor 84 reads the broadcasting video data which has been stored in the second memory 90. The second video processor 84 format-transforms the broadcasting video data into a sub-picture format in the case that an image to be output on the screen is a sub-picture, and format-transforms the broadcasting video data into a main picture format in the case that an image to be output on the screen is a main picture, under the control of the host processor 50. For example, in the case that the broadcasting video data supplied from the first video processor 83 is an image to be output on a sub-picture and the broadcasting video data supplied from the second video processor 84 is an image to be output on a main picture, the first video processor 83 format-transforms the broadcasting video data into a sub-picture format and outputs the format transformed result to the PIP processor and image output portion 85 and the second video processor 84 format-transforms the broadcasting video data read from the second memory 90 into a main picture format. Here, the second video processor 84 format-transforms the external video signal into a main picture format in the case that the user selects a screen output function of the external video signal and outputs the format transformed result to the PIP processor and image output portion 85. The PIP processor and image output portion 85 processes the sub-picture format transformed video data input from the first video processor 83 and the main picture format transformed video data input from the second video processor 84, into a PIP screen and outputs the PIP screen format transformed result via the output port V4. In this manner, the two transport streams (TS) are input to each decoder and decoded therein and output as a PIP screen.

In this embodiment, the two broadcasting signals are input and decoded simultaneously, in order to realize a PIP screen. However, it is possible to realize a PIP screen using either one broadcasting signal and one external video signal, or two external video signals.

As described above, the present invention provides an effect of performing a PIP function in which a plurality of decoders decode each broadcasting signal.

What is claimed is:

1. A digital broadcasting receiver comprising:

a first tuner for detecting a first broadcasting signal of a first selected channel and outputting the detected first broadcasting signal;

a second tuner for detecting a second broadcasting signal of a second selected channel and outputting the detected second broadcasting signal;

first and second channel decoders for decoding the first and second broadcasting signals input from the first and second tuners, respectively, into a prior-to-being-channel-coded state;

a first decoder for decoding the first broadcasting signal which has been channel-decoded by the first channel decoder and outputting first broadcasting image data;

a second decoder for decoding the second broadcasting signal which has been channel-decoded by the second channel decoder and outputting second broadcasting image data, and for format transforming the first and second broadcasting image data into a main picture format or a sub-picture format in order to output a picture-in-picture (PIP) screen;

a first memory connected to the first decoder for storing the first broadcasting signal;

a second memory connected to the second decoder for storing the second broadcasting signal; and a host processor for controlling operation of the first and second tuners, the first and second channel decoders, and the first and second decoders in order generate a PIP screen using a received broadcasting signal.

2. The digital broadcasting receiver of claim 1, wherein said first decoder receives an external video signal under the control of the host processor when a user selects a screen output function of the external video signal.

3. The digital broadcasting receiver of claim 1, wherein said second decoder comprises:

a demultiplexer for extracting video data from the channel-decoded second broadcasting signal from the second channel decoder and storing the extracted video data in the second memory;

a video decoder for reading the video data stored in said second memory, decoding the read video data and storing the decoded result in said second memory;

a first video processor for format-transforming the first broadcasting image data into one of the main picture format or the sub-picture format;

a second video processor for format-transforming the second broadcasting image data into the other one of the main picture format or the sub-picture format; and a PIP processor and image output portion for outputting the format transformed video data supplied from the first video processor and the second video processor on a PIP screen.

4. The digital broadcasting receiver of claim 3, wherein said second video processor format-transforms the received external video signal into the other one of the main picture format or the sub-picture format under the control of the host processor, when the user selects a screen output function of the external video signal.

5. A digital broadcasting receiver comprising:

a first tuner for detecting a first broadcasting signal of a first selected channel and outputting the detected first broadcasting signal;

a second tuner for detecting a second broadcasting signal of a second selected channel and outputting the detected second broadcasting signal;

first and second channel decoders for decoding the first and second broadcasting signals input from the first and second tuners, respectively, into a prior-to-being-channel-coded state;

a first decoder for decoding the first broadcasting signal which has been channel-decoded by the first channel decoder and outputting first broadcasting image data;

a second decoder for decoding the second broadcasting signal which has been channel-decoded by the second channel decoder and outputting second broadcasting image data;

picture-in-picture (PIP) image output means for signal-processing the first and second broadcasting image data in order to output a PIP screen;

a first memory connected to the first decoder for storing the first broadcasting signal;

a second memory connected to the second decoder for storing the second broadcasting signal; and a host processor for controlling operation of the first and second tuners, the first and second channel decoders, and the first and second decoders in order generate a PIP screen using a received broadcasting signal, wherein said PIP image output means comprises:

a first video processor for format-transforming the first broadcasting image data into one of a main picture format or a sub-picture format;

a second video processor for format-transforming the second broadcasting image data into the other one of the main picture format or the sub-picture format; and a PIP processor and image output portion for outputting the format transformed video data supplied from the first video processor and the second video processor on a PIP screen.

6. The digital broadcasting receiver of claim 5, wherein said first decoder receives an external video signal under the control of the host processor when a user selects a screen output function of the external video signal.

7. The digital broadcasting receiver of claim 5, wherein said second video processor format-transforms the received external video signal into the other one of the main picture format or the sub-picture format under the control of the host processor, when the user selects a screen output function of the external video signal.

8. The digital broadcasting receiver of claim 1, wherein said first and second selected channels are the same channel.

9. The digital broadcasting receiver of claim 5, wherein said first and second selected channels are the same channel.

* * * * *